United States Patent [19]
Polito

[11] Patent Number: 4,776,628
[45] Date of Patent: Oct. 11, 1988

[54] SUN VISOR EXTENSION

[76] Inventor: Joseph J. Polito, 1913 N. Woodlawn Ave., Metairie, La. 70139

[21] Appl. No.: 50,855

[22] Filed: May 18, 1987

[51] Int. Cl.⁴ .............................................. B60J 3/02
[52] U.S. Cl. .................................... 296/97.6; 296/97.8
[58] Field of Search .......................... 296/97 F, 97 C; 160/DIG. 3

[56] References Cited

U.S. PATENT DOCUMENTS 4,169,552 10/1979 Lichtenstein ..................... 296/97 G
4,323,275 4/1982 Lutz ................................... 296/97 G
4,526,415 7/1985 Jardine ............................. 296/97 G
4,690,451 9/1987 Killar ................................ 296/97 G Primary Examiner—Robert R. Song
Attorney, Agent, or Firm—Michael D. Carbo

[57] ABSTRACT

A shield that may be slidably attached to a sun visor of a vehicle, and the shield when so attached capable of being longitudinally and transversely adjusted on the sun visor to serve as an extension thereof in blocking out sun rays to the occupant of a vehicle.

1 Claim, 1 Drawing Sheet

SUN VISOR EXTENSION

BACKGROUND OF THE INVENTION

The present invention relates to sun visors, and more particularly to an apparatus for extending the sunshade protection of a vehicle visor.

Conventional sunshades or visors are generally attached near the top of an automobile windshield. Such conventional sunshades are generally relatively flat. These conventional sunshades or visors generally have only two degrees of rotational freedom, one in an arc around a horizonal axis and the other in an arc around a vertical axis.

The use of a sunshade or a visor to block the sun from direct line of sight of the eyes of an occupant of a vehicle requires that the sunshade or visor be placed in the line of sight. Such placement is not always possible, especially when the sun is low in the sky early in the day and late in the day.

Accordingly, it is an object of this invention to allow for increased sunshade protection over the protection afforded by the conventional sun visor.

Another object of this invention is to provide additional protection from direct sunlight to occupants of a motor vehicle, particularly occupants in the front seat.

Yet another object of this invention is to allow one to minimize the size of a sun visor when it is not in use.

Another object of this invention is to allow for a moveable extension of a sun visor.

Still another object of this invention is to achieve increased sunshade protection by use of the new apparatus.

Additional objects and advantages of the invention are set forth in part in the description which follows, and in part are obvious from the description or may be learned by practice of the invention. The objects and advantages of the invention may be realized and obtained by means of the articles and apparatus particularly pointed out in the appended claims.

To achieve the foregoing objects, and in accordance with the purposes of the invention as broadly described herein, an apparatus for providing sunshade protection is provided wherein the apparatus comprises (1) a sleeve adapted to be placed over a sun visor of a vehicle, said sleeve being substantially congruent with said vehicle sun visor; and (2) an extendable element, said element slidably attached to said sleeve, said element being slidable to a position for providing increased sunshade protection.

Preferably, the apparatus according to the invention is constructed of a light-weight material such as cardboard or plastic and is folded to assume its functional shape.

BRIEF DESCRIPTION OF THE DRAWINGS

A greater appreciation of the objects and advantages of the invention may be understood by the below set forth detailed description taken in conjunction with the drawings, wherein:

FIGS. 1(a) and 1(b) show the components of an illustrative embodiment of an apparatus for providing sunshade protection according to the invention, wherein FIG. 1(a) is a perspective view of a sleeve element according to the invention and FIG. 1(b) is a side view of an extension element according to the invention.

DETAILED DESCRIPTION OF THE INVENTION

Figure 1A:
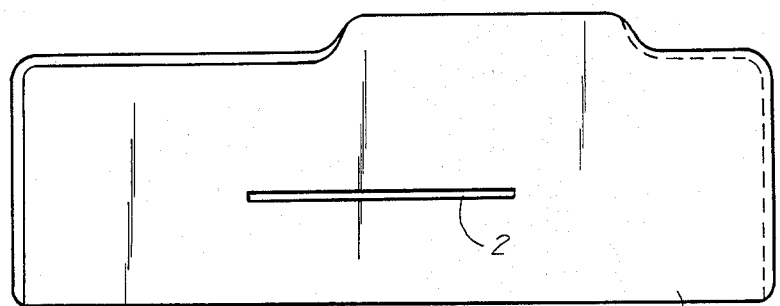
Figure 1B:
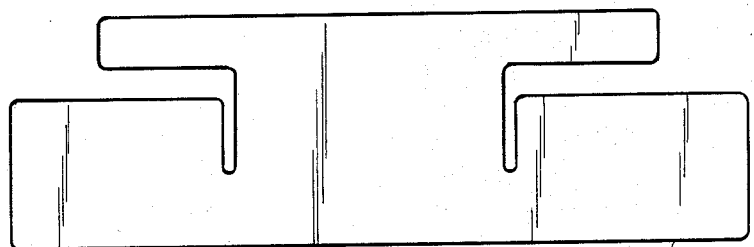
Figure 2A:
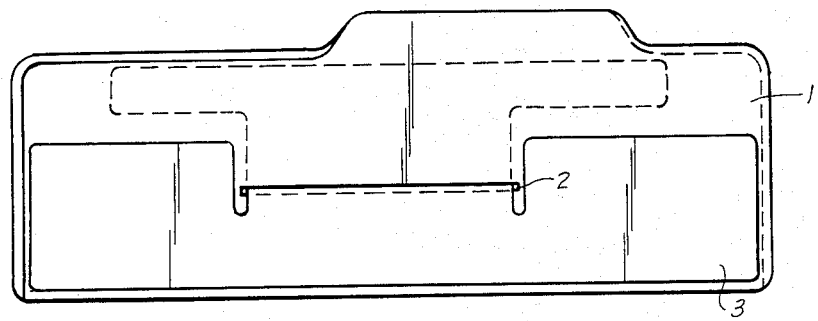
FIG. 2(a) is a side view of an illustrative embodiment of an apparatus according to the invention showing the extension element in its unextended position.
Figure 2B:
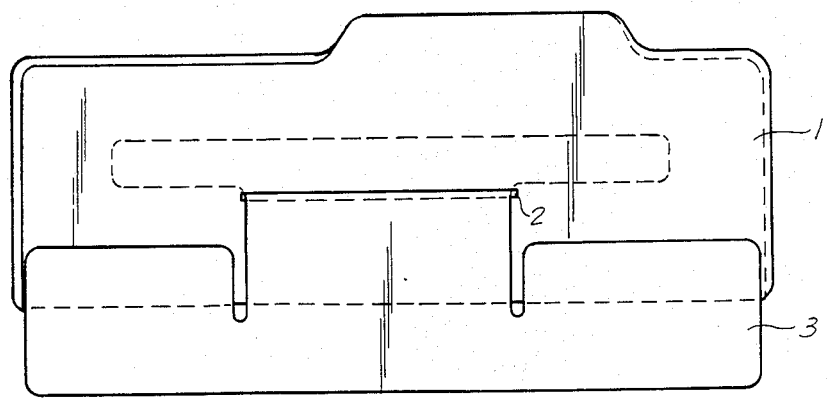
FIG. 2(b) is a side view of an illustrative embodiment of an apparatus according to the invention, showing the extension element in an extended position.

FIGS. 1(a) and 2(b) taken together show the components of an apparatus for providing sunshade protection according to the invention. Shown is body element numeral one comprising a sleeve for slidably placing said body element one on to a vehicle sun visor. Body element one contains cut out numeral two adapted for insertion of a portion of extension element three, shown in FIG. 1(b).

Body element one is constructed of light-weight material such as cardboard and is folded to assume its functional shape. Body element one, being sleeve-shaped is adaptable for placing over a vehicle sun visor. Body element numeral one is moveable with a conventional sun visor to any of the conventional visor's positions. Body element numeral one may take different sizes and shapes according to the size and shape of a conventional vehicle visor.

In operation, extension element numeral three is slidably attached to body numeral one by inserting a portion element three through cut out numeral two. FIG. 2(a) shows said element three in an unextended position. FIG. 2(b) shows said element three in an extended position. When used as shown in FIG. 2(b), the illustrative apparatus according to the invention provides additional sunshade protection as compared with a conventional visor.

Preferably, body element one and extension element three are at least as wide as a conventional vehicle visor. Body element one and extension element three may take many different sizes and shapes according to the size and shape of different conventional vehicle visors. For example, a visor extension for a truck would be larger than one for a sub-compact automobile.

The apparatus according to the invention is designed to increase such a protection. The extension is larger than a vehicle visor. In its position centered on a vehicle visor, it provides additional protection. Body element one is slidable horizonally along a conventional vehicle visor to provide additional sunshade protection adjacent to the visor.

Extension element three is a slidable insert, preferably approximately sixteen inches long and approximately three to four inches wide. Extension element three can be manually lowered as needed to provide additional protection from the sun. Extension element three can be extended when a vehicle visor is in practically any position.

It would be apparent to one skilled in the art that modifications and variations can be made in the apparatus for providing sunshade protection according to the invention. The invention in its broader aspects is not limited to the specific details and illustrative examples shown and described. Accordingly, departure may be made from such details without departing from the spirit or scope of applicant's general inventive concept.

What is claimed is:

1. An apparatus for providing sunshade protection, the apparatus comprising:

(a) A sleeve element adapted for slidable attachment onto a sun visor of a vehicle, said sleeve having a horizontally oriented cut out portion adapted for slidable insertion of an extension element; and
(b) an extension element adapted for slidable attachment to said sleeve, said extension element being slidably extendable to provide increased sunshade protection; and
(c) the extension element being slidably attached to the sleeve through the cut-out portion.

* * * * *